United States Patent
Medles et al.

(10) Patent No.: US 12,273,838 B2
(45) Date of Patent: Apr. 8, 2025

(54) DELAY DRIFT RATE COMPENSATION IN NON-TERRESTRIAL NETWORK COMMUNICATIONS

(71) Applicant: MediaTek Singapore Pte. Ltd., Singapore (SG)

(72) Inventors: Abdelkader Medles, Cambridge (GB); Gilles Charbit, Cambridge (GB)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 134 days.

(21) Appl. No.: 18/260,437

(22) PCT Filed: Jan. 12, 2022

(86) PCT No.: PCT/CN2022/071552
§ 371 (c)(1),
(2) Date: Jul. 5, 2023

(87) PCT Pub. No.: WO2022/152152
PCT Pub. Date: Jul. 21, 2022

(65) Prior Publication Data
US 2024/0064676 A1  Feb. 22, 2024

Related U.S. Application Data

(60) Provisional application No. 63/136,229, filed on Jan. 12, 2021.

(51) Int. Cl.
| | | |
|---|---|---|
| H04W 56/00 | (2009.01) | |
| H04B 7/01 | (2006.01) | |
| H04B 7/185 | (2006.01) | |

(52) U.S. Cl.
CPC .......... *H04W 56/0045* (2013.01); *H04B 7/01* (2013.01); *H04B 7/18563* (2013.01); *H04W 56/0035* (2013.01)

(58) Field of Classification Search
CPC ......... H04W 56/0045; H04W 56/0035; H04W 84/06; H04B 7/01; H04B 7/18563
See application file for complete search history.

(56) References Cited

U.S. PATENT DOCUMENTS

| | | | |
|---|---|---|---|
| 6,058,306 | A | 5/2000 | Liu |
| 2005/0288012 | A1 | 12/2005 | Morgan |

(Continued)

FOREIGN PATENT DOCUMENTS

| | | |
|---|---|---|
| CN | 101124742 A | 2/2008 |
| CN | 111800851 A | 10/2020 |
| WO | 2020/169048 A1 | 8/2020 |

OTHER PUBLICATIONS

International Search Report and Written Opinion dated Apr. 1, 2022, issued in application No. PCT/CN2022/071552.

*Primary Examiner* — Ashley Shivers
(74) *Attorney, Agent, or Firm* — McClure, Qualey & Rodack, LLP

(57) ABSTRACT

Various solutions for synchronization in non-terrestrial network (NTN) communications are proposed. An apparatus implemented in a user equipment (UE) obtains at least one of a downlink (DL) pre-compensated frequency value applied on a service link from a satellite of a non-terrestrial network (NTN) and a feeder link delay drift rate of a feeder link between a network node and the satellite. The apparatus further obtains a Doppler frequency shift value. Then, the apparatus performs a timing compensation through adjusting a sampling rate according to at least one of the DL pre-compensated frequency value, the feeder link delay drift rate, and the Doppler frequency shift value.

20 Claims, 5 Drawing Sheets

(56) References Cited

U.S. PATENT DOCUMENTS

| | | |
|---|---|---|
| 2021/0392597 A1 | 12/2021 | Xu et al. |
| 2023/0362857 A1* | 11/2023 | Ghanbarinejad . H04W 56/0045 |
| 2023/0422195 A1* | 12/2023 | Yao ................... H04B 7/18513 |
| 2024/0064677 A1* | 2/2024 | Yan ................... H04W 56/0015 |

* cited by examiner

DELAY DRIFT RATE COMPENSATION IN NON-TERRESTRIAL NETWORK COMMUNICATIONS

CROSS REFERENCE TO RELATED PATENT APPLICATION(S)

The present disclosure is part of a non-provisional application claiming the priority benefit of U.S. Provisional Patent Application No. 63/136,229, filed 12 Jan. 2021, the content of which being incorporated by reference in its entirety.

TECHNICAL FIELD

The present disclosure is generally related to mobile communications and, more particularly, to delay drift rate compensation in non-terrestrial network (NTN) communications.

BACKGROUND

Unless otherwise indicated herein, approaches described in this section are not prior art to the claims listed below and are not admitted as prior art by inclusion in this section.

In NTN communications, in order to compensate for propagation delay and Doppler shift in wireless communications over a link, a user equipment (UE) needs to be aware of certain information. For example, the UE needs to know its UE position (e.g., via Global Navigation Satellite System (GNSS) positioning or a known position), the position and velocity of a satellite (or other flying object(s)) functioning as part of the NTN communications, and a time reference with respect to the position and velocity of the satellite. In case the satellite is a reference point, there would be no need for the UE to obtain information on a feeder link between a land-based network node (e.g., base station) and the satellite. In case the propagation delay includes the feeder link, the UE would need to know either the position of the land-based network node or information related to the feeder link (e.g., feeder link delay and delay drift rate). In case there is switching delay due to processing at the satellite, the UE would also need to know the switching delay.

The UE usually synchronizes the downlink (DL) to the received frequency and adjust its clock based on the received frequency fc=fc_nominal+fd, fc is the received signal (i.e., adjusted carrier frequency), fc_nominal is the nominal carrier frequency, and fd is the Doppler frequency shift value. Therefore, when sampling the received signal, the UE uses an adjusted sampling frequency fs=fs_nominal*(fc_nominal+fd)/fc_nominal, fs is the adjusted sampling frequency, and fs_nominal is the nominal sampling frequency. Normally, the UE will automatically adjust DL frequency for the delay drift rate on the service link, so the delay drift on the service link is not usually a problem. However, the feeder link delay drift is not compensated by synchronizing to the DL frequency.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues. More specifically, various schemes proposed in the present disclosure are believed to address issues pertaining to timing compensation in NTN communications.

In one aspect, a method may involve an apparatus obtaining at least one of a downlink (DL) pre-compensated frequency value applied on a service link from a satellite of a non-terrestrial network (NTN) and a feeder link delay drift rate of a feeder link between a network node and the satellite. The method may also involve the apparatus obtaining a Doppler frequency shift value. The method may also involve the apparatus performing a timing compensation through adjusting a sampling rate according to at least one of the DL pre-compensated frequency value, the feeder link delay drift rate, and the Doppler frequency shift value.

In another aspect, an apparatus may include a transceiver and a processor coupled to the transceiver. The transceiver may be configured to wirelessly communicate with a non-terrestrial network (NTN). The processor may be configured to obtain, via the transceiver, at least one of a downlink (DL) pre-compensated frequency value applied on a service link from a satellite of the NTN and a feeder link delay drift rate of a feeder link between a network node and the satellite, and to obtain a Doppler frequency shift value. The processor may also perform a timing compensation through adjusting a sampling rate according to at least one of the DL pre-compensated frequency value, the feeder link delay drift rate, and the Doppler frequency shift value.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT), Narrow Band Internet of Things (NB-IoT), Industrial Internet of Things (IIoT), non-terrestrial network (NTN) and 6th Generation (6G), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to timing compensation in NTN communications. According to the present disclosure, a number of possible solutions may be implemented separately or jointly. That is, although these possible solutions may be described below separately, two or more of these possible solutions may be implemented in one combination or another.

Figure 1:
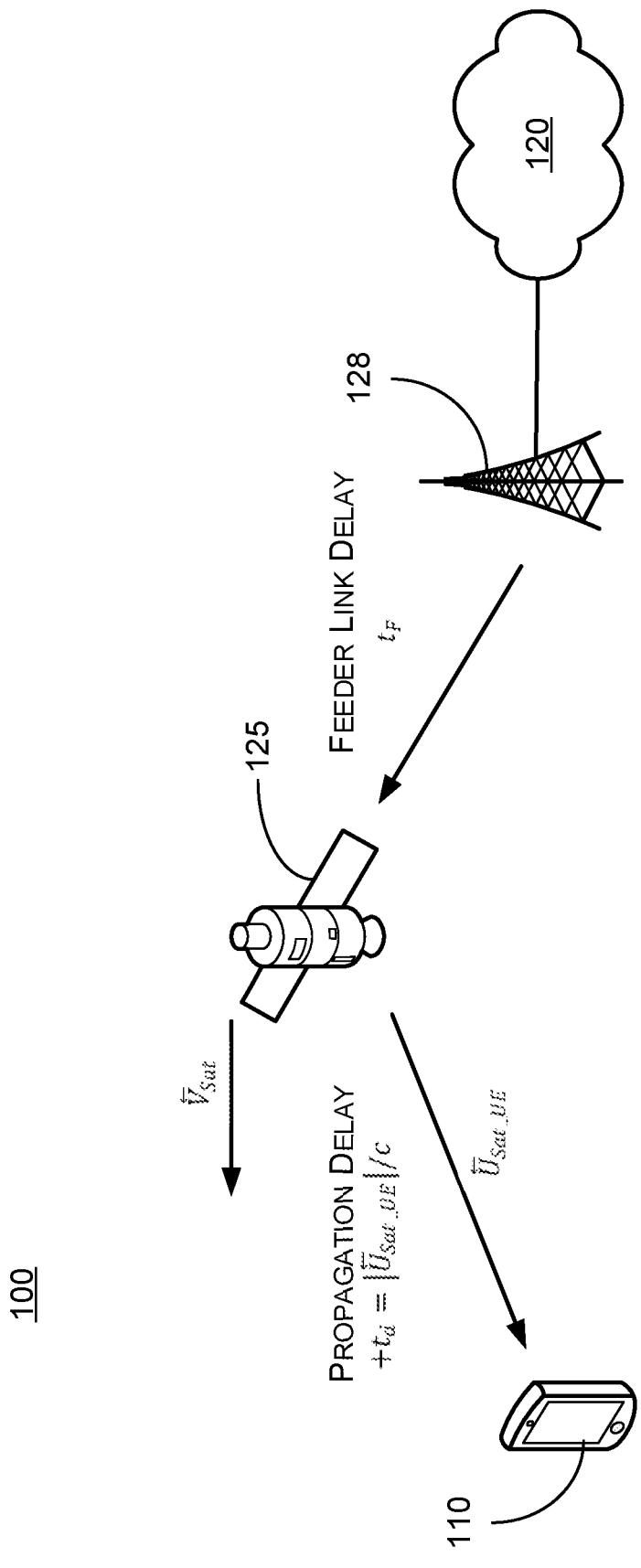
FIG. 1 is a diagram of an example network environment in which various proposed schemes in accordance with the present disclosure may be implemented.

FIG. 1 illustrates an example network environment 100 in which various proposed schemes in accordance with the present disclosure may be implemented. Network environment 100 may involve a UE 110 and a wireless network 120 (e.g., an LTE network, a 5G network, an NR network, an IoT network, an NB-IoT network, an IIoT network, an NTN network or a 6G network). The UE 110 may communicate with the wireless network 120 via a non-terrestrial (NT) network node 125 (e.g., a satellite) and/or a terrestrial network node 128 (e.g., a gateway, base station, eNB, gNB or transmission/reception point (TRP)).

Referring to FIG. 1, the NT network node 125 may be moving at a speed of $V_{sat}$ with a relative motion/velocity of $U_{sat\_UE}$ with respect to the UE 110, and there may be a feeder link delay $t_F$ associated with the feeder link between a terrestrial network node 128 and the NT network node 125. Correspondingly, a propagation delay $T_d$ and a Doppler shift $f_{Doppler}$ may result. In FIG. 1, $f_c$ denotes the frequency of a carrier signal and c denotes the speed of light. Under various proposed schemes in accordance with the present disclosure, each of the UE 110, the NT network node 125 and the terrestrial network node 128 may be configured to perform operations pertaining to at least one of the DL pre-compensated frequency value, the feeder link delay drift rate, and the Doppler frequency shift value for timing compensation in NTN communications, as described below.

Under a proposed scheme in accordance with the present disclosure, the DL pre-compensated frequency value, the feeder link delay drift rate, and the Doppler frequency shift value may be broadcast by a wireless network 120 in a broadcast message (e.g., system information block (SIB)). In an event that the SIB is an existing SIB, the DL pre-compensated frequency value, the feeder link delay drift rate, and the Doppler frequency shift value may be added to an information element (IE) definition for the existing SIB. In an event that the SIB is a new SIB, a new IE may be defined for the new SIB that includes the DL pre-compensated frequency value, the feeder link delay drift rate, and the Doppler frequency shift value.

Under the proposed scheme, TA drift rate may also be broadcast by the wireless network 120 in the broadcast message. In an event that the SIB is an existing SIB, the TA drift rate may be added to the IE definition for the existing SIB. In an event that the SIB is a new SIB, a new IE may be defined for the new SIB that includes the TA drift rate.

Under the proposed scheme, UE 110 may acquire and apply the DL pre-compensated frequency value, the feeder link delay drift rate, and the Doppler frequency shift value either upon every reception of a SIB containing at least one of the DL pre-compensated frequency value, the feeder link delay drift rate, TA drift rate, and the Doppler frequency shift value or only when explicitly indicated by wireless network 120. In an event that UE 110 applies the DL pre-compensated frequency value, the feeder link delay drift rate, and the Doppler frequency shift value upon every reception of a SIB containing at least one of the DL pre-compensated frequency value, the feeder link delay drift rate, TA drift rate, and the Doppler frequency shift value, the UE 110 may store the received DL pre-compensated frequency value, the received feeder link delay drift rate, and the received Doppler frequency shift value and update it when the UE 110 acquires another transmission of the SIB from wireless network 120.

For instance, the UE 110 may consider the stored DL pre-compensated frequency value, the stored feeder link delay drift rate, and the stored Doppler frequency shift value as invalid and may replace the stored DL pre-compensated frequency value, the stored feeder link delay drift rate, and the stored Doppler frequency shift value with the new DL pre-compensated frequency value, the new feeder link delay drift rate, and the new Doppler frequency shift value contained in a subsequently received SIB.

Under the proposed scheme, a validity timer may be utilized and the duration of the validity timer may be pre-determined (e.g., defined in a pertinent 3GPP specification such as Release 16 of the 3GPP specification), configured by radio resource control (RRC) signaling from wireless network 120, indicated in the SIB separately, or indicated as part of the DL pre-compensated frequency value, the feeder link delay drift rate, TA drift rate or the Doppler frequency shift value.

In an event that UE 110 applies the DL pre-compensated frequency value, the feeder link delay drift rate, and the Doppler frequency shift value when explicitly indicated by wireless network 120, a change in the SIB content may be indicated explicitly in the SIB (e.g., by toggling one bit in the SIB) as a way to instruct the UE 110 to apply the DL pre-compensated frequency value, the feeder link delay drift rate, and the Doppler frequency shift value contained in the respective SIB. Accordingly, upon reception of the SIB containing the DL pre-compensated frequency value, the feeder link delay drift rate, and the Doppler frequency shift value, the UE 110 may apply the DL pre-compensated frequency value, the feeder link delay drift rate, and the Doppler frequency shift value when the indication bit is toggled (e.g., when its value is set to "1").

Under the proposed scheme, the UE 110 may acquire the SIB with at least one of the DL pre-compensated frequency value, the feeder link delay drift rate, TA drift rate, and the Doppler frequency shift value at various times. For instance, the UE 110 may acquire the SIB with at least one of the DL pre-compensated frequency value, the feeder link delay drift rate, TA drift rate, and the Doppler frequency shift value prior to a paging occasion. Alternatively, or additionally, the UE 110 may acquire the SIB with at least one of the DL pre-compensated frequency value, the feeder link delay drift rate, TA drift rate, and the Doppler frequency shift value following a paging message. Alternatively, or additionally, the UE 110 may acquire the SIB with at least one of the DL pre-compensated frequency value, the feeder link delay drift rate, TA drift rate, and the Doppler frequency shift value prior to a random access channel (RACH) transmission.

Under the proposed scheme, upon successful acquisition of the SIB with at least one of the DL pre-compensated frequency value, the feeder link delay drift rate, and the Doppler frequency shift value, the UE 110 may apply the received DL pre-compensated frequency value, the received feeder link delay drift rate, and the received Doppler frequency shift value indicated in the SIB to adjust the sampling rate for compensating the delay time on the feeder link and the service link.

The DL pre-compensated frequency value, the feeder link delay drift rate, and the Doppler frequency shift value may be used by UE 110 in all RRC states or modes including, for example and without limitation, an idle mode (e.g., RRC_IDLE), a connected mode (e.g., RRC_CONNECTED), and an inactive mode (e.g., RRC_INACTIVE) (in NR). While in the RRC_CONNECTED mode, UE 110 may perform monitoring and acquisition of the SIB with at least one of the DL pre-compensated frequency value, the feeder link delay drift rate, TA drift rate, and the Doppler frequency shift value.

For NB-IoT, a change in UE behavior may be required. In Release 15 (Rel-15) of the 3GPP specification, a NB-IoT UE does not acquire the system information in RRC_CONNECTED mode while a timer is not running. As an option, wireless network 120 may provide the DL pre-compensated frequency value, the feeder link delay drift rate, and the Doppler frequency shift value to UE 110 via a dedicated signaling.

For instance, wireless network 120 may provide the DL pre-compensated frequency value, the feeder link delay drift rate, and the Doppler frequency shift value to UE 110 within an RRCConnectionReconfiguration message or an RRCReconfiguration message. It is noteworthy that the option of using a dedicated RRC message to provide the DL pre-compensated frequency value, the feeder link delay drift rate, and the Doppler frequency shift value to UE 110 may be as alternative or in addition to providing the DL pre-compensated frequency value, the feeder link delay drift rate, and the Doppler frequency shift value in an SIB (e.g., by broadcast).

Under the proposed scheme, in case UE 110 is unable to acquire the SIB with the DL pre-compensated frequency value, the feeder link delay drift rate, and the Doppler frequency shift value (and for an NTN cell), the UE 110 may consider the cell as barred and, accordingly, may bar the cell for a predetermined period. Alternatively, or additionally, UE 110 may return to RRC_IDLE mode in case UE 110 was in RRC_CONNECTED mode or RRC_INACTIVE mode (in NR) and then perform cell reselection.

Under the proposed scheme, UE 110 may obtain at least one of the DL pre-compensated frequency value from a NT network node 125 (e.g., satellite) of the non-terrestrial network and the feeder link delay drift rate of a feeder link between the network apparatus 220 (e.g., base station) and the satellite. The DL pre-compensated frequency value is applied on a service link by the satellite based on a Doppler expected at the center of the satellite beam on the ground. In some implementations, UE 110 receives the feeder link delay drift rate from the network apparatus 220. In some implementations, UE 110 obtains a timing advance (TA) drift rate of the feeder link and derives the feeder link delay drift rate as half the TA drift rate.

The UE 110 may obtain the Doppler frequency shift value of the service link. In some implementations, UE 110 measures a received frequency of the DL signal and derives the Doppler frequency shift value according to the received frequency and a nominal frequency. The Doppler frequency shift value $fd=fc-fc\_nominal$, fc is the received frequency, and the fc_nominal is the nominal frequency.

The UE 110 may perform timing compensation through adjusting a sampling rate according to at least one of the DL pre-compensated frequency value, the feeder link delay drift rate, and the Doppler frequency shift value.

In some implementations, UE 110 may perform timing compensation through adjusting a sampling rate according to all of the DL pre-compensated frequency value, the feeder link delay drift rate, and the Doppler frequency shift value. The adjusted sampling rate $fs\_adjusted=fs*(1-Ddrift\_FL)*(fc\_nominal+fd)/(fc\_nominal-f\_precomp+fd)$, fs is the sampling rate derived based on the synchronization to DL frequency, Ddrift_FL is the feeder link delay drift rate, fc_nominal is the nominal frequency, fd is the Doppler frequency shift value, and the f_precomp is the DL pre-compensated frequency value.

The adjusted sampling rate may be calculated by $fs\_adjusted \sim fs*(1-Ddrift\_FL+f\_precomp/(fc\_nominal-f\_precomp+fd))$.

If no Common Doppler (i.e., DL pre-compensated frequency value and Doppler frequency shift value) is present, processor 212 performs timing compensation only according to the feeder link delay drift rate, and the adjusted sampling rate is calculated by $fs\_adjusted=fs*(1-Ddrift\_FL)$.

If no feeder link delay drift rate is present, the adjusted sampling rate is calculated by $fs\_adjusted \sim fs*(1+f\_precomp/(fc\_nominal-f\_precomp+fd))$.

Under the proposed scheme, the timing compensation may be performed by adjusting the DL timing of the NT network node 125 (e.g., satellite) that serves the UE 110.

In some implementations, UE 110 may further measure a received frequency of a DL signal and derive the Doppler frequency shift value according to the received frequency and a nominal frequency.

Illustrative Implementations

Figure 2:
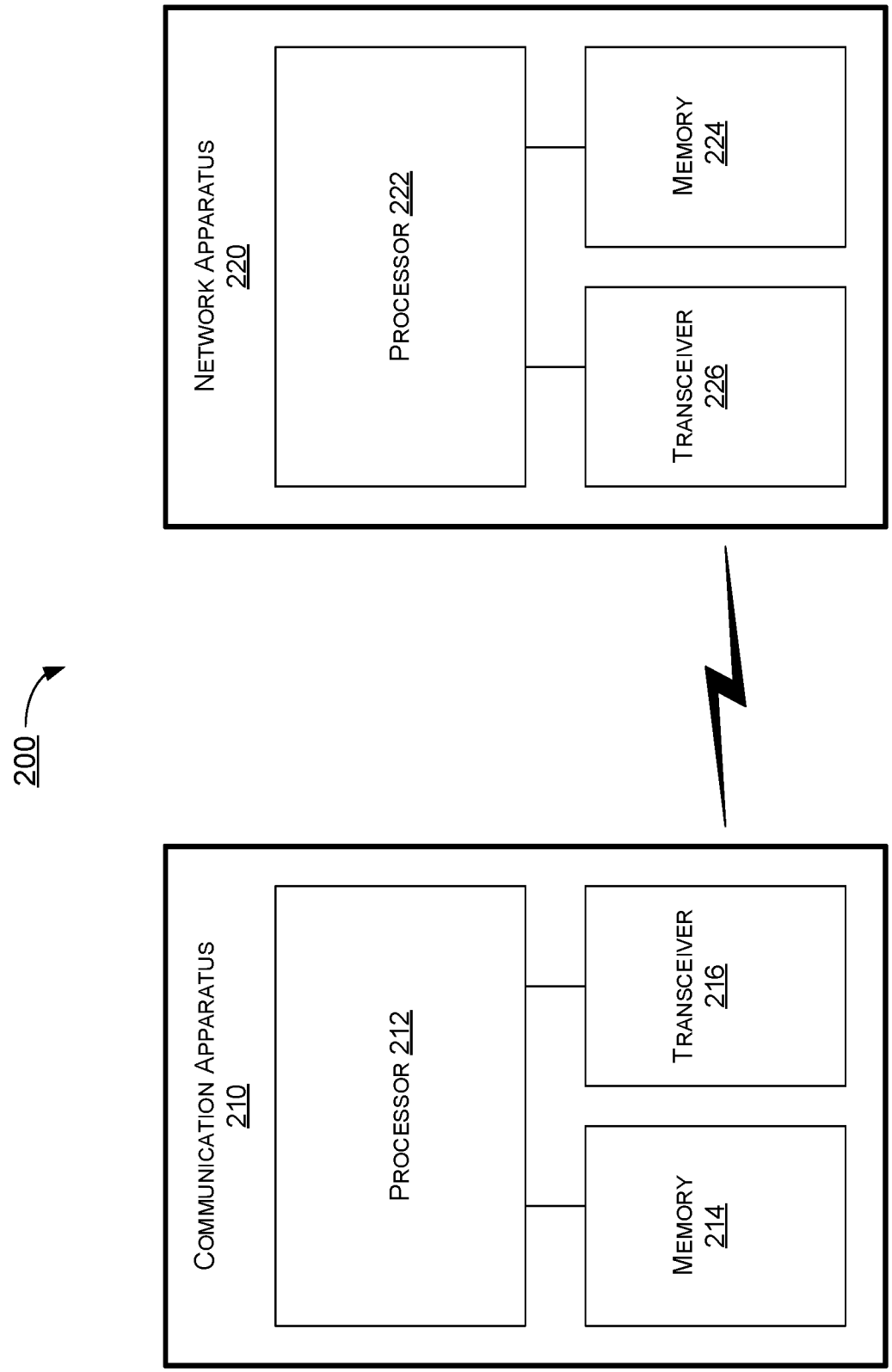
FIG. 2 is a block diagram of an example communication apparatus and an example network apparatus in accordance with an implementation of the present disclosure.

FIG. 2 illustrates an example communication apparatus 210 and an example network apparatus 220 in accordance with an implementation of the present disclosure. Each of communication apparatus 210 and network apparatus 220 may perform various functions to implement schemes, techniques, processes and methods described herein pertaining to DL pre-compensated frequency value, feeder link delay drift rate, and Doppler frequency shift value for timing compensation in NTN communications, including scenarios/schemes described above as well as processes 300, 400 and 500 described below.

Communication apparatus 210 may be a part of an electronic apparatus, which may be a UE such as a portable or mobile apparatus, a wearable apparatus, a wireless communication apparatus or a computing apparatus. For instance, communication apparatus 210 may be implemented in a smartphone, a smartwatch, a personal digital assistant, a digital camera, or a computing equipment such as a tablet computer, a laptop computer or a notebook computer. Communication apparatus 210 may also be a part of a machine type apparatus, which may be an IoT, NB-IoT, IIoT or NTN apparatus such as an immobile or a stationary apparatus, a home apparatus, a wire communication apparatus or a computing apparatus. For instance, communication apparatus 210 may be implemented in a smart thermostat, a smart fridge, a smart door lock, a wireless speaker or a home control center.

Alternatively, communication apparatus 210 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 210 may include at least some of those components shown in FIG. 2 such as a processor 212, for example. Communication apparatus 210 may further include one or more other components not pertinent to the proposed scheme of the present disclosure (e.g., internal power supply, display device and/or user interface device), and, thus, such component(s) of communication apparatus 210 are neither shown in FIG. 2 nor described below in the interest of simplicity and brevity.

Network apparatus 220 may be a part of an electronic apparatus/station, which may be a network node such as a base station, a small cell, a router, a gateway or a satellite. For instance, network apparatus 220 may be implemented in an eNodeB in an LTE, in a gNB in a 5G, NR, 6G, IoT, NB-IoT, IIoT, or in a satellite in an NTN network. Alternatively, network apparatus 220 may be implemented in the form of one or more IC chips such as, for example and without limitation, one or more single-core processors, one or more multi-core processors, or one or more RISC or CISC processors. Network apparatus 220 may include at least some of those components shown in FIG. 2 such as a processor 222, for example. Network apparatus 220 may further include one or more other components not pertinent to the proposed scheme of the present disclosure (e.g., internal power supply, display device and/or user interface device), and, thus, such component(s) of network apparatus 220 are neither shown in FIG. 2 nor described below in the interest of simplicity and brevity.

In one aspect, each of processor 212 and processor 222 may be implemented in the form of one or more single-core processors, one or more multi-core processors, or one or more CISC processors. That is, even though a singular term "a processor" is used herein to refer to processor 212 and processor 222, each of processor 212 and processor 222 may include multiple processors in some implementations and a single processor in other implementations in accordance with the present disclosure. In another aspect, each of processor 212 and processor 222 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 212 and processor 222 is a special-purpose machine specifically designed, arranged and configured to perform specific tasks including power consumption reduction in a device (e.g., as represented by communication apparatus 210) and a network (e.g., as represented by network apparatus 220) in accordance with various implementations of the present disclosure.

In some implementations, communication apparatus 210 may also include a transceiver 216 coupled to processor 212 and capable of wirelessly transmitting and receiving data. In some implementations, communication apparatus 210 may further include a memory 214 coupled to processor 212 and capable of being accessed by processor 212 and storing data therein. In some implementations, network apparatus 220 may also include a transceiver 226 coupled to processor 222 and capable of wirelessly transmitting and receiving data. In some implementations, network apparatus 220 may further include a memory 224 coupled to processor 222 and capable of being accessed by processor 222 and storing data therein. Accordingly, communication apparatus 210 and network apparatus 220 may wirelessly communicate with each other via transceiver 216 and transceiver 226, respectively.

Each of communication apparatus 210 and network apparatus 220 may be a communication entity capable of communicating with each other using various proposed schemes in accordance with the present disclosure. To aid better understanding, the following description of the operations, functionalities and capabilities of each of communication apparatus 210 and network apparatus 220 is provided in the context of a mobile communication environment in which communication apparatus 210 is implemented in or as a communication apparatus or a UE (e.g., UE 110) and network apparatus 220 is implemented in or as a network node or base station (e.g., NT network node 125 or terrestrial network node 128) of a communication network (e.g., network 120). It is also noteworthy that, although the example implementations described below are provided in the context of NTN communications, the same may be implemented in other types of networks.

Under a proposed scheme pertaining to DL pre-compensated frequency value, feeder link delay drift rate, and Doppler frequency shift value for timing compensation in NTN communications in accordance with the present disclosure, with communication apparatus 210 implemented in or as UE 110 and network apparatus 220 implemented in or as NT network node 125 or terrestrial network node 128 in network environment 100.

Processor 212 of the communication apparatus 210 may receive the DL pre-compensated frequency value from a NT network node 125 (e.g., satellite) of the non-terrestrial network. The DL pre-compensated frequency value is applied on a service link by the satellite based on a Doppler expected at the center of the satellite beam on the ground.

Processor 212 may obtain the feeder link delay drift rate of a feeder link between the network apparatus 220 (e.g., base station) and the satellite. In some implementations, processor 212 may receive the feeder link delay drift rate from the network apparatus 220. In some implementations, processor 212 obtain TA drift rate of the feeder link, processor 212 may derive the feeder link delay drift rate as half the TA drift rate.

Processor 212 may obtain the Doppler frequency shift value of the service link. In some implementations, processor 212 may measure a received frequency of the DL signal and derive the Doppler frequency shift value according to the received frequency and a nominal frequency. The Doppler frequency shift value fd=fc−fc_nominal, fc is the received frequency, and the fc_nominal is the nominal frequency.

Additionally, processor 212 may perform timing compensation through adjusting a sampling rate according to at least one of the DL pre-compensated frequency value, the feeder link delay drift rate, and the Doppler frequency shift value.

In one aspect, processor 212 may perform timing compensation through adjusting a sampling rate according to all of the DL pre-compensated frequency value, the feeder link delay drift rate, and the Doppler frequency shift value. The adjusted sampling rate $fs\_adjusted=fs*(1-Ddrift\_FL)*(fc\_nominal+fd)/(fc\_nominal-f\_precomp+fd)$, fs is the sampling rate derived based on the synchronization to DL frequency, Ddrift_FL is the feeder link delay drift rate, fc_nominal is the nominal frequency, fd is the Doppler frequency shift value, and the f_precomp is the DL pre-compensated frequency value.

It shall be noted that the DL pre-compensated frequency value needs to be signaled to the communication apparatus 210 for removing when performing timing compensation because the DL signal to be measured already includes a Doppler frequency shift value. Therefore, when calculating the adjusted sampling rate, the DL pre-compensated frequency value needs to be removed. Moreover, the DL pre-compensated frequency value may be beam specific.

In another aspect, the adjusted sampling rate may be calculated by $fs\_adjusted\sim fs*(1-Ddrift\_FL+f\_precomp/(fc\_nominal-f\_precomp+fd))$.

In one aspect, if no Common Doppler (i.e., DL pre-compensated frequency value and Doppler frequency shift value) is present, processor 212 performs timing compensation only according to the feeder link delay drift rate, and the adjusted sampling rate is calculated by $fs\_adjusted=fs*(1-Ddrift\_FL)$.

In another aspect, if no feeder link delay drift rate is present, the adjusted sampling rate is calculated by $fs\_adjusted\sim fs*(1+f\_precomp/(fc\_nominal-f\_precomp+fd))$.

Another method of the timing compensation is to adjust the DL timing of the satellite that serves the UE 110.

In some implementations, processor 212 may further measure a received frequency of a DL signal and derive the Doppler frequency shift value according to the received frequency and a nominal frequency.

In some implementations, in obtaining the DL pre-compensated frequency value, processor 212 may obtain DL pre-compensated frequency value via a dedicated signaling within a RRC message such as a RRC connection reconfiguration (RRCConnectionReconfiguration) message or a RRC reconfiguration (RRCReconfiguration) message.

In some implementations, in obtaining DL pre-compensated frequency value, processor 212 may perform certain operations. For instance, processor 212 may acquire a SIB containing DL pre-compensated frequency value. Additionally, processor 212 may receive the SIB containing DL pre-compensated frequency value from the wireless network.

In some implementations, processor 212 may perform additional operations. For instance, processor 212 may store, in memory 214, DL pre-compensated frequency value. Moreover, processor 212 may update the stored DL pre-compensated frequency value with new DL pre-compensated frequency value subsequently received from the wireless network.

In some implementations, in updating the stored DL pre-compensated frequency value, processor 212 may perform certain operations. For instance, processor 212 may determine the status of a validity timer. Moreover, processor 212 may perform either of the following: (a) in response to the validity timer having expired, updating the stored DL pre-compensated frequency value with the new DL pre-compensated frequency value (e.g., by re-acquiring the SIB with the DL pre-compensated frequency value); or (b) in response to the validity timer being running, continuing to use the stored DL pre-compensated frequency value without updating the stored DL pre-compensated frequency value with the new DL pre-compensated frequency value.

In some implementations, a duration of the validity timer may be pre-determined. Alternatively, the duration of the validity timer may be configured by a RRC signaling from the wireless network. Alternatively, the duration of the validity timer may be separately indicated in a SIB which contains the DL pre-compensated frequency value. Alternatively, the duration of the validity timer may be indicated in a SIB as a part of the DL pre-compensated frequency value.

In some implementations, in obtaining the feeder link delay drift rate, processor 212 may receive the feeder link delay drift rate via a dedicated signaling within a RRC message such as a RRC connection reconfiguration (RRCConnectionReconfiguration) message or a RRC reconfiguration (RRCReconfiguration) message. Alternatively, processor 212 may receive the TA drift rate via a dedicated signaling within a RRC message and calculate the feeder link delay drift rate as half the TA drift rate.

In some implementations, in obtaining the feeder link delay drift rate, processor 212 may perform certain operations. For instance, processor 212 may acquire a SIB containing the feeder link delay drift rate. Alternatively, processor 212 may acquire a SIB containing the TA drift rate and calculate the feeder link delay drift rate as half the TA drift rate. Additionally, processor 212 may receive the SIB containing the feeder link delay drift rate from the wireless network. Alternatively, processor 212 may receive the SIB containing the TA drift rate and calculate the feeder link delay drift rate as half the TA drift rate.

In some implementations, processor 212 may perform additional operations. For instance, processor 212 may store, in memory 214, the feeder link delay drift rate. Moreover, processor 212 may update the stored feeder link delay drift rate with new feeder link delay drift rate subsequently received from the wireless network.

In some implementations, in updating the stored feeder link delay drift rate, processor 212 may perform certain operations. For instance, processor 212 may determine the status of a validity timer. Moreover, processor 212 may perform either of the following: (a) in response to the validity timer having expired, updating the stored feeder link delay drift rate with the new feeder link delay drift rate (e.g., by re-acquiring the SIB with the feeder link delay drift rate or the TA drift rate); or (b) in response to the validity timer being running, continuing to use the stored feeder link delay drift rate without updating the stored feeder link delay drift rate with the new feeder link delay drift rate.

In some implementations, a duration of the validity timer may be fixed. Alternatively, the duration of the validity timer may be configured by a RRC signaling from the wireless network. Alternatively, the duration of the validity timer may be separately indicated in a SIB which contains the feeder link delay drift rate or the TA drift rate. Alternatively, the duration of the validity timer may be indicated in a SIB as a part of the feeder link delay drift rate.

In some implementations, in obtaining the Doppler frequency shift value, processor 212 may receive Doppler frequency shift value via a dedicated signaling within a RRC message such as a RRC connection reconfiguration (RRCConnectionReconfiguration) message or a RRC reconfiguration (RRCReconfiguration) message. Alternatively, processor 212 may measure the received frequency of the DL signal and derive the Doppler frequency shift value according to the received frequency and the nominal frequency.

In some implementations, in obtaining the Doppler frequency shift value, processor 212 may perform certain operations. For instance, processor 212 may acquire a SIB containing the Doppler frequency shift value. Alternatively, processor 212 may measure the received frequency of the DL signal and derive the Doppler frequency shift value according to the received frequency and the nominal frequency. Additionally, processor 212 may receive the SIB containing the Doppler frequency shift value from the wireless network. Alternatively, processor 212 may measure the received frequency of the DL signal and derive the Doppler frequency shift value according to the received frequency and the nominal frequency.

In some implementations, processor 212 may perform additional operations. For instance, processor 212 may store, in memory 214, the Doppler frequency shift value. Moreover, processor 212 may update the stored Doppler frequency shift value with new Doppler frequency shift value subsequently received from the wireless network.

In some implementations, in updating the stored Doppler frequency shift value, processor 212 may perform certain operations. For instance, processor 212 may determine the status of a validity timer. Moreover, processor 212 may perform either of the following: (a) in response to the validity timer having expired, updating the stored Doppler frequency shift value with the new Doppler frequency shift value (e.g., by re-acquiring the SIB with the feeder link delay drift rate or measuring the received frequency of the DL signal); or (b) in response to the validity timer being running, continuing to use the stored Doppler frequency shift value without updating the stored Doppler frequency shift value with the new Doppler frequency shift value.

In some implementations, a duration of the validity timer may be fixed. Alternatively, the duration of the validity timer may be configured by a RRC signaling from the wireless network. Alternatively, the duration of the validity timer may be separately indicated in a SIB which contains the Doppler frequency shift value. Alternatively, the duration of the validity timer may be indicated in a SIB as a part of the Doppler frequency shift value.

Illustrative Processes

Figure 3:
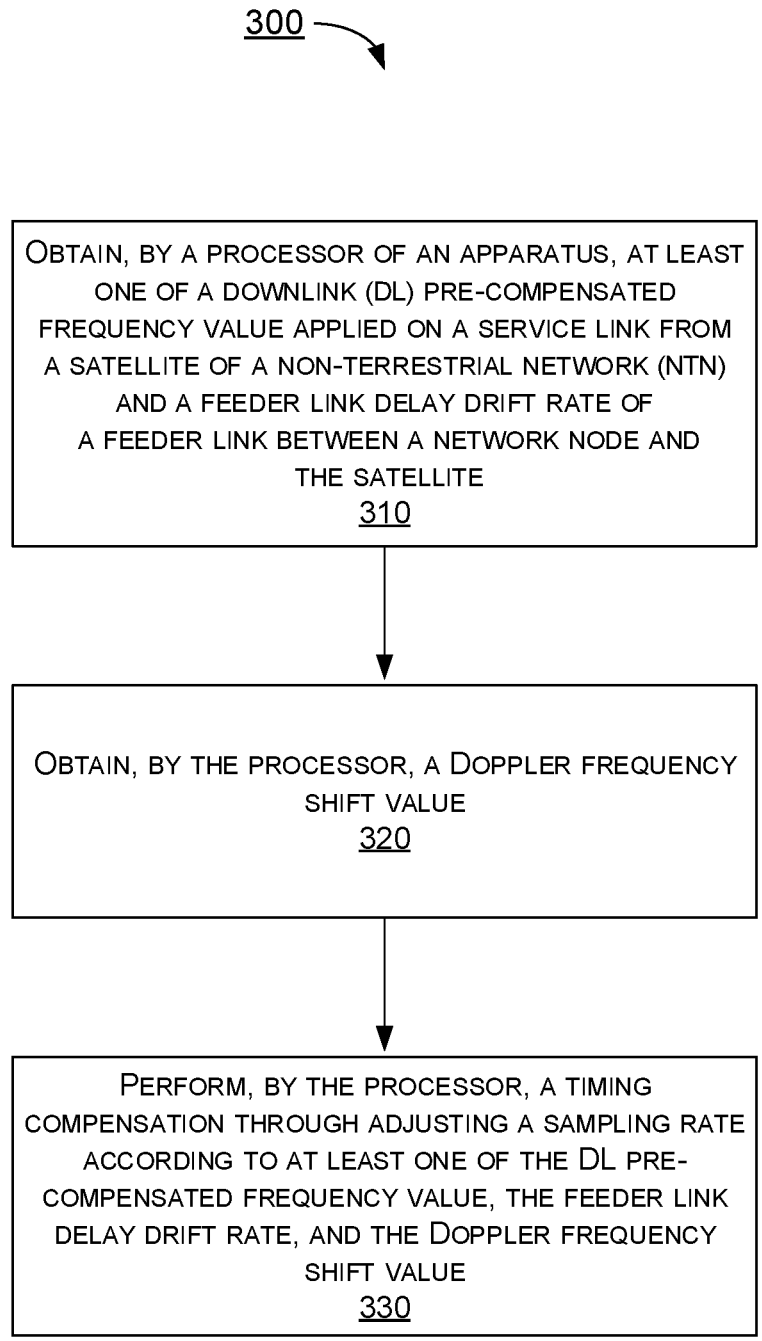
FIG. 3 is a flowchart of an example process in accordance with an implementation of the present disclosure.
Figure 4:
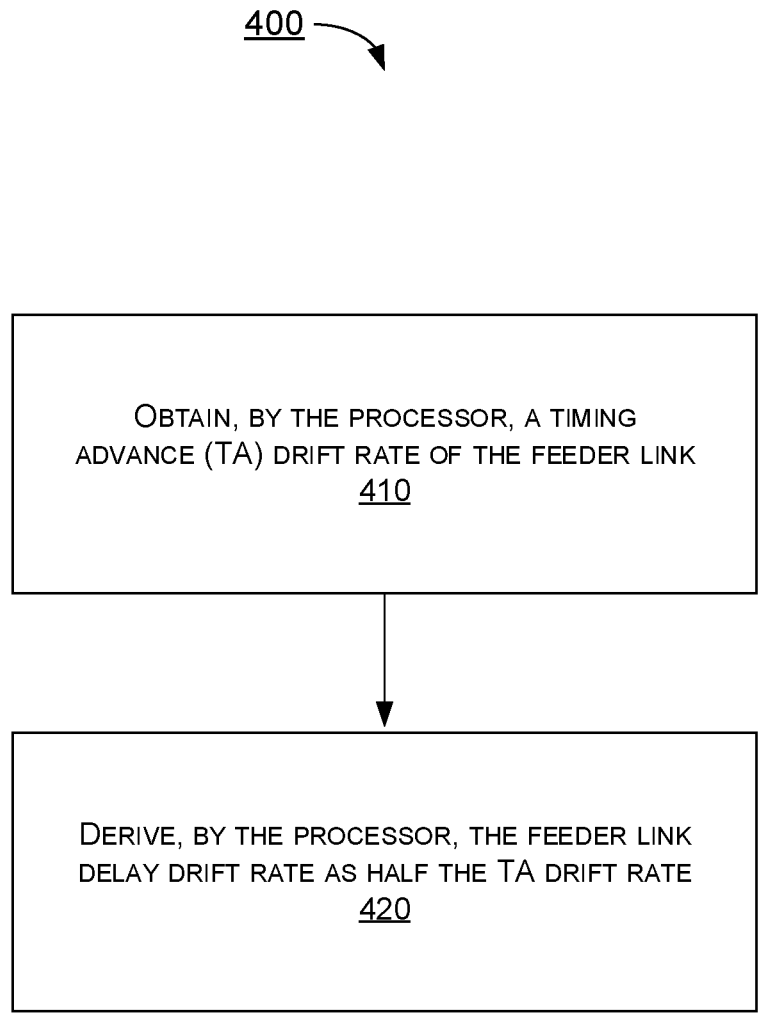
FIG. 4 is a flowchart of an example process in accordance with an implementation of the present disclosure.
Figure 5:
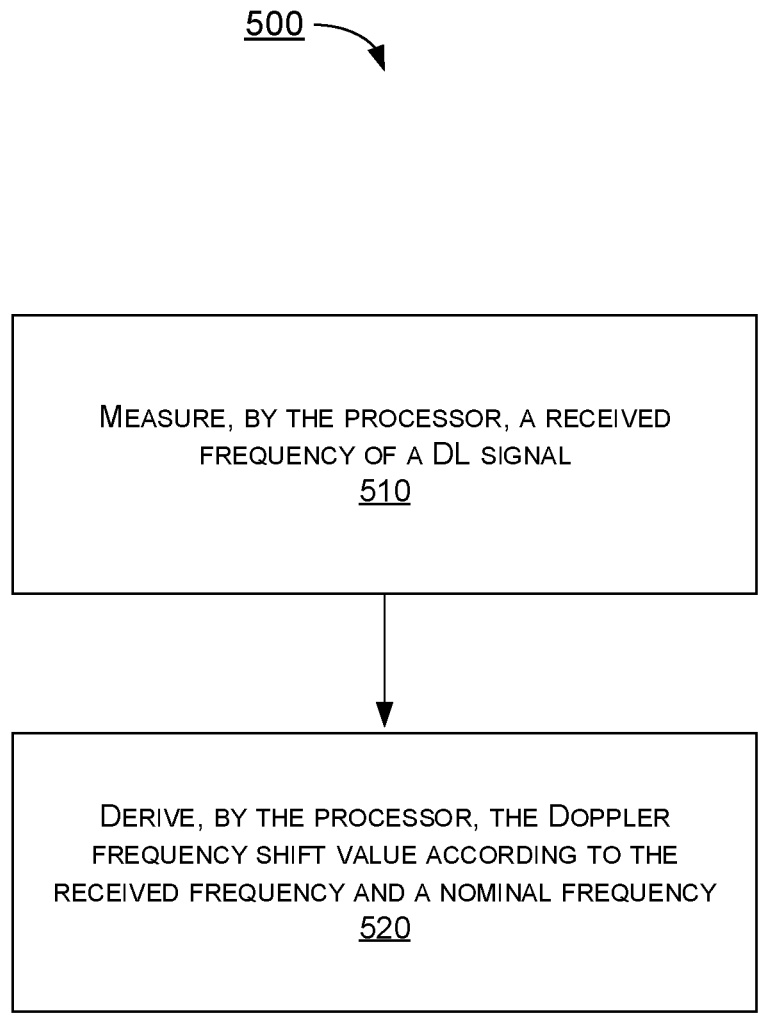
FIG. 5 is a flowchart of an example process in accordance with an implementation of the present disclosure.

FIGS. 3-5 illustrates an example process 300, 400, and 500 in accordance with an implementation of the present disclosure. Process 300, 400, and 500 may be an example implementation of schemes described above, whether partially or completely, with respect to DL pre-compensated frequency value, feeder link delay drift rate, and Doppler frequency shift value for timing compensation in NTN communications in accordance with the present disclosure. Process 300, 400, and 500 may represent an aspect of implementation of features of communication apparatus 210. Process 300, 400, and 500 may include one or more operations, actions, or functions as illustrated by one or more of blocks.

Although illustrated as discrete blocks, various blocks of process 300, 400, and 500 may be divided into additional blocks, combined into fewer blocks, or eliminated, depending on the desired implementation. Moreover, the blocks of process 300, 400, and 500 may executed in the order or, alternatively, in a different order. Process 300, 400, and 500 may be implemented by communication apparatus 210 or any suitable UE or machine type devices. Solely for illustrative purposes and without limitation, process 300, 400, and 500 are described below in the context of communication apparatus 210 and network apparatus 220.

Process 300 may begin at block 310. At block 310, process 300 may involve processor 212 of communication apparatus 210 obtaining, via transceiver 216, at least one of a downlink (DL) pre-compensated frequency value applied on a service link from a satellite of a non-terrestrial network (NTN) and a feeder link delay drift rate of a feeder link between a network node and the satellite.

At Block 310, obtaining a feeder link delay drift rate of a feeder link between a network node and the satellite may be replaced by process 400 shown in FIG. 4. FIG. 4 begins at block 410. At block 410, process 400 may involve processor 212 obtaining a TA drift rate of the feeder link. Process 400 may proceed from block 410 to block 420.

At block 420, process 400 may involve processor 212 deriving the feeder link delay drift rate as half the TA drift rate.

In other words, in case processor 212 merely obtain the TA drift rate without receiving the feeder link delay drift rate from a network node, processor 212 may derive the feeder link delay drift rate according to the TA drift rate. Alternatively, if only feeder link delay drift rate is provided, the TA drift rate can be derived as double feeder link delay drift rate.

Return to process 300 which may proceed from block 310 to block 320. At block 320, process 300 may involve processor 212 obtaining a Doppler frequency shift value.

Block 320 may be replaced by process 500 shown in FIG. 5. FIG. 5 begins at block 510. At block 510, process 500 may involve processor 212 measuring a received frequency of a DL signal. Process 500 may proceed from block 510 to block 520.

At block 520, process 500 may involve processor 212 deriving the Doppler frequency shift value according to the received frequency and a nominal frequency.

Return to process 300 which may proceed from block 320 to block 330. At block 330, process 300 may involve processor 212 performing a timing compensation through adjusting a sampling rate according to at least one of the DL pre-compensated frequency value, the feeder link delay drift rate, and the Doppler frequency shift value.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   obtaining, by a processor of an apparatus, at least one of a downlink (DL) pre-compensated frequency value applied on a service link from a satellite of a non-terrestrial network (NTN) and a feeder link delay drift rate of a feeder link between a network node and the satellite;
   obtaining, by the processor, a Doppler frequency shift value; and
   performing, by the processor, a timing compensation through adjusting a sampling rate according to at least one of the DL pre-compensated frequency value, the feeder link delay drift rate, and the Doppler frequency shift value.

2. The method of claim 1, wherein the timing compensation is further performed by adjusting a downlink (DL) timing of the satellite.

3. The method of claim 1, further comprising:
   obtaining, by the processor, a timing advance (TA) drift rate of the feeder link; and
   deriving, by the processor, the feeder link delay drift rate as half the TA drift rate.

4. The method of claim 1, wherein the DL pre-compensated frequency value is beam specific.

5. The method of claim 1, further comprising:
   measuring, by the processor, a received frequency of a DL signal; and
   deriving, by the processor, the Doppler frequency shift value according to the received frequency and a nominal frequency.

6. The method of claim 1, wherein the obtaining of the feeder link delay drift rate comprises acquiring a system information block (SIB) containing the feeder link delay drift rate.

7. The method of claim 1, wherein the obtaining of the feeder link delay drift rate comprises receiving the feeder link delay drift rate via a dedicated signaling within a radio resource control (RRC) message.

8. The method of claim 1, wherein the obtaining of the DL pre-compensated frequency value comprises acquiring a system information block (SIB) containing the DL pre-compensated frequency value.

9. The method of claim 1, wherein the obtaining of the DL pre-compensated frequency value comprises obtaining the DL pre-compensated frequency value via a dedicated signaling within a radio resource control (RRC) message.

10. The method of claim 1, wherein the obtaining of the Doppler frequency shift value comprises acquiring a system information block (SIB) containing the Doppler frequency shift value prior to a random access channel (RACH) transmission.

11. An apparatus, comprising:
    a transceiver configured to wirelessly communicate with a non-terrestrial network (NTN); and
    a processor coupled to the transceiver and configured to perform operations comprising:
       obtaining, via the transceiver, at least one of a downlink (DL) pre-compensated frequency value applied on a service link from a satellite of the NTN and a feeder link delay drift rate of a feeder link between a network node and the satellite;
       obtaining a Doppler frequency shift value; and
       performing a timing compensation through adjusting a sampling rate according to at least one of the DL pre-compensated frequency value, the feeder link delay drift rate, and the Doppler frequency shift value.

12. The method of claim 11, wherein the timing compensation is further performed by adjusting a downlink (DL) timing of the satellite.

13. The method of claim 11, wherein the processor further performs operations comprising:

obtaining, via the transceiver, a timing advance (TA) drift rate of the feeder link; and deriving the feeder link delay drift rate as half the TA drift rate.

14. The method of claim 11, wherein the DL pre-compensated frequency value is beam specific.

15. The method of claim 11, wherein the processor further performs operations comprising:

measuring a received frequency of a DL signal; and deriving the Doppler frequency shift value according to the received frequency and a nominal frequency.

16. The method of claim 11, wherein in obtaining the feeder link delay drift rate, the processor acquires a system information block (SIB) containing the feeder link delay drift rate.

17. The method of claim 11, wherein in obtaining the feeder link delay drift rate, the processor receives, via the transceiver, the feeder link delay drift rate within a radio resource control (RRC) message.

18. The method of claim 11, wherein in obtaining the DL pre-compensated frequency value, the processor acquires a system information block (SIB) containing the DL pre-compensated frequency value.

19. The apparatus of claim 11, wherein in obtaining the DL pre-compensated frequency value, the processor obtains, via the transceiver, the DL pre-compensated frequency value within a radio resource control (RRC) message.

20. The apparatus of claim 11, wherein the obtaining of the Doppler frequency shift value comprises acquiring a system information block (SIB) containing the Doppler frequency shift value prior to a random access channel (RACH) transmission.

* * * * *